(No Model.)
S. J. MORGAN.
MILK RECEIVER.
No. 482,264. Patented Sept. 6, 1892.
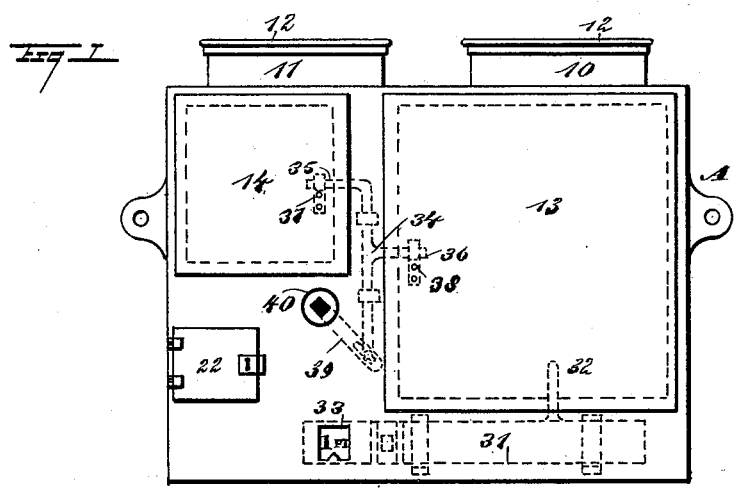
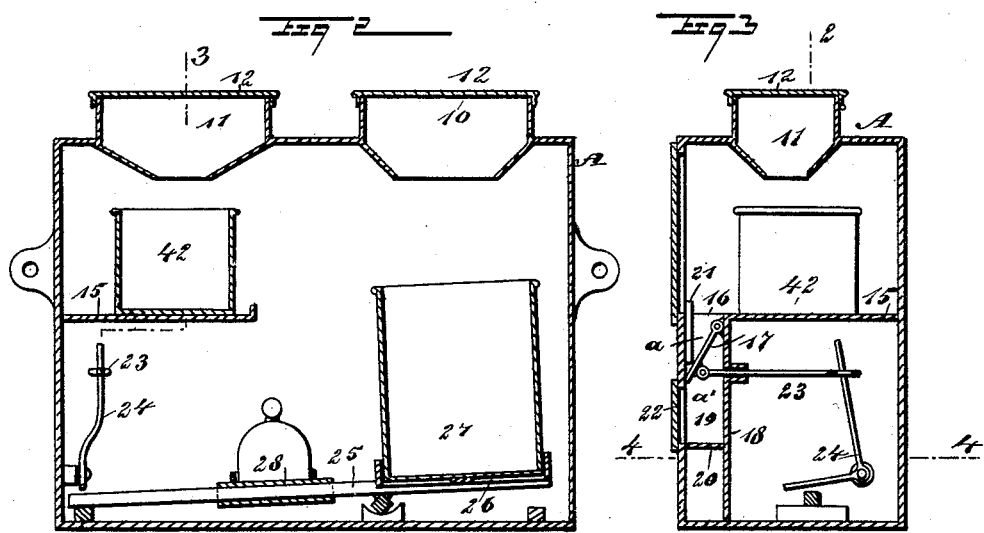
WITNESSES:
H. Walker
C. Sedgwick
INVENTOR
S. J. Morgan
BY
Munn & Co
ATTORNEYS.

UNITED STATES PATENT OFFICE.

SILAS J. MORGAN, OF LA GRANGE, ILLINOIS.

MILK-RECEIVER.

SPECIFICATION forming part of Letters Patent No. 482,264, dated September 6, 1892.

Application filed April 4, 1892. Serial No. 427,622. (No model.)

*To all whom it may concern:*

Be it known that I, SILAS J. MORGAN, of La Grange, in the county of Cook and State of Illinois, have invented a new and Improved Milk and Cream Receiver, of which the following is a full, clear, and exact description.

My invention relates to an improvement in milk and cream receivers, and has for its object to provide a box or casing with chutes communicating with the interior and adapted to receive milk and cream and to conduct the material into reservoirs or receptacles placed within the box or casing.

A further object of the invention is to provide the box or casing with scales adapted to receive and hold the vessel in which the milk is to be delivered from the milk-conducting chute or hopper, and also to provide a pocket for the reception of a ticket or tickets, and a means whereby when a proper quantity of milk has been delivered to the receptacle located upon the scale the weight of the milk will cause the pocket to be automatically opened and permit the ticket to drop down into a compartment especially adapted to receive it, the ticket-pocket being closed automatically the moment that the milk-receiving receptacle is removed from the scale.

Another object of the invention is to provide a means whereby the scale may be adjusted to balance when any predetermined amount of liquid is placed in the receptacle carried by the scale, and, further, to provide an indicator visible from the exterior of the box, which will indicate to the party delivering the milk the required quantity.

Another object of the invention is to provide a lock which when moved in one direction will lock all the doors leading into the interior of the box and when the lock is manipulated in a contrary direction will unlock all of said doors, the lock being so constructed that the key manipulating it may be readily removed therefrom.

From the foregoing it will be observed that the device provides for the dropping of a ticket when the required quantity of milk or other liquid has been placed therein, which preserves the ticket from being lost or stolen and also protects the milk from dust, insects, and from being tampered with or stolen, and, further, that its use insures good measure, as a ticket will not be dropped so that it can be removed until the proper or required weight has been placed upon the scale.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a front elevation of the receiver. Fig. 2 is a central vertical and longitudinal section taken, practically, on the line 2 2 of Fig. 3. Fig. 3 is a transverse vertical section taken, practically, on the line 3 3 of Fig. 2. Fig. 4 is a horizontal section taken, practically, on the line 4 4 of Fig. 3, and Fig. 5 is a detail perspective view of the key employed to open the doors of the receiver.

The body of the receiver A is of box-like shape—that is, it is preferably made rectangular in general contour—and in the top two funnels or hoppers 10 and 11 are usually located, having communication with the interior of the box-like body, one near each end, and these funnels or hoppers are provided with suitable covers 12, hinged or otherwise attached thereto.

At the front the box-like body is provided with two main doors 13 and 14. The door 13 is the larger and is located at one side of the front, and when open exposes the greater portion of the interior thereof. The second door 14 is located in the upper corner, at the opposite end of the front, as is best shown in Fig. 1, and discloses when open a horizontal partition or shelf 15. (Best shown in Figs. 2 and 3.)

In the front portion of the shelf or partition 15 an opening 16 is made, and immediately below the inner wall of the opening a damper 17 is hinged at its upper end, the lower end being free, and from a point at or near the top of the recessed portion 16 of the horizontal partition 15 a vertical partition 18 is formed, extending downward to the bottom of the box-body, as is best shown in Fig. 3, forming thereby a compartment 19, which is preferably provided with a partition 20; but the partition may be removed if desired. The damper 17 is adapted to be held in engagement with the front wall of the compartment 19, extending diagonally across said compartment, and when so located the compartment is divided into upper and lower sections $a$ and $a'$, as is likewise best shown in Fig. 3, the upper compartment $a$ being adapted to receive a ticket 21, which is to be given in payment for the milk delivered, and the lower section $a'$ of the compartment is provided with an opening which is normally closed by a door 22. This door is normally kept locked and the milkman has the key, and at proper time the damper 17 is drawn back and the ticket 21 will drop into the lower portion of the compartment 19, from which it may be removed when the door 22 is opened. The damper 17 is held in its diagonal position, which is its position to support the ticket through the medium of a rod 23, held to slide through an opening in the partition 18, the said rod being preferably pivotally connected with the damper near its lower end. The inner end of the rod is within the main compartment of the box-body adjacent to one end and is in connection with the upper arm of an elbow or crank lever 24, the lower member of which elbow or crank lever normally stands in an inclined position, which compels its upper member to force the rod 23 outward.

In the bottom of the box-body a scale-beam 25 is fulcrumed, and this scale-beam is provided at one end with a platform 26, preferably of spider-like construction, adapted to receive the receptacle 27, into which the milk is to be placed, and this receptacle is so located when upon the scale that it will receive any liquid that may be poured down through one of the hoppers 10. The scale-beam carries a movable slide-weight 28, and this slide-weight is provided with an arm 29, which extends outward in direction of the front of the box-body, and the arm of the weight enters a socket 30, formed in a slide 31, which is held to travel next to the inner front face of the box-body at or near the bottom thereof. This slide is operated through the medium of an attached handle 32, which extends upward within reach when the door 13 is opened. The slide has produced upon its outer face a scale representing pints, fractions of pints, quarts, and gallons, and the scale is adapted to pass by an opening 33, made in the front of the box-body, as shown in Fig. 1, and the weight 28 upon the scale-beam is so calculated that when, for instance, that portion of the scale indicating one pint appears at the opening 33 it will require the weight of one pint of milk to bear up the weight 28, and as soon as this weight is borne up so as to tip the end of the weighing-beam upward opposite that end carrying the milk-receiving can the said end will press up the lower member of the angle-lever 24, carrying inward the rod 23, drawing back thereby the damper 17, and permitting the ticket carried by the damper to drop down at the bottom of the compartment 19 within reach of the party delivering the milk or other liquid.

The two doors 13 and 14 are adapted to be locked simultaneously and unlocked in like manner. This is accomplished through the medium of a bolt 34, held to slide vertically in suitable bearings upon the inner face of the front wall of the box-body between the openings covered by the doors, as is shown in dotted lines in Fig. 1. This bolt is provided with two arms 35 and 36. The arm 35 is the upper arm and is adapted to engage with a keeper 37, attached to the inner face of the smaller door 14, while the arm 36 extends in an opposite direction to the arm 35 and is purposed to engage with a keeper 38, secured upon the inner face of the larger door 13. These keepers are open at the top, so that by a vertical movement of the bolt its arms may be carried out through the keepers and brought into locking engagement therewith. The bolt is actuated through the medium of a crank 39, the bolt having pivotal connection with one end of the crank, and the opposite end of the crank is secured to a barrel 40, held to turn in a suitable opening produced in the front face of the body, as is likewise shown in Fig. 1, and this barrel is provided with an opening to receive a key, the opening being preferably made rectangular, as illustrated, and the key is similarly shaped in cross-section, as illustrated at 41 in Fig. 5.

In the operation of locking or of unlocking the doors 13 and 14 when the crank 39 is carried upward by the manipulation of the barrel 40 the bolt is carried out of engagement with the keepers upon the doors. When, however, the crank-arm is drawn downward, a locking engagement is effected between the doors and the bolt. It will be observed that the bolt and crank-arm are located within the box-body, so that they are not accessible from the outer side, and unless one has a key fitting the barrel 40 the doors cannot be opened and if opened cannot be locked. The partition 15 is adapted to receive a receptacle 42, receiving whatever material is poured into the hopper beneath which it is located.

It is evident that by the use of a device of the above description the party being served will of necessity receive proper weight or measure, and unless that weight or measure be given the party serving will not receive any remuneration; also, that by means of the device the party serving can discern at a glance what amount of liquid the party being served desires.

The box-body is adapted to be attached to any support within or without a building, and the device may be made of any suitable material and, as heretofore stated, may partake of any desired general contour.

Having thus described my invention, I claim as new and desire to secure by Letters Patent—

1. The combination, with the scale-beam and the receptacle-platform carried thereby, of a ticket-delivery mechanism connected with the scale-beam and operated thereby when the receptacle receives the proper quantity, substantially as set forth.

2. In a device of the character described, the combination, with the box-body provided with a hopper leading into the interior and a sub-compartment having an opening at one end and a damper pivoted at the opposite end of the sub-compartment, which damper is capable of extending across the compartment, of a trip-lever, a connection between the trip-lever and the damper, and a scale-beam one end of which is adapted for engagement with the trip-lever, which beam is also provided with a platform located beneath the hopper, the platform being adapted to receive a vessel, substantially as shown and described.

3. In a device of the character described, the combination, with a box-body and a feed apparatus leading into the body, the said body being provided with a sub-compartment and a damper pivoted in the compartment, of a trip-lever, a connection between the trip-lever and the damper, a scale-beam fulcrumed within the box-body, one end of the beam being adapted for engagement with the trip-lever, the said beam being also provided with a platform located beneath the feed apparatus, a weight adjustably placed upon the beam, and a slide carrying a scale connected with the adjustable weight, whereby the said weight may be moved in such a manner as to regulate the weighing capacity of the scale, substantially as shown and described.

4. In a device of the character described, the combination, with a casing provided with a supply-hopper, a ticket-receiving compartment having a drop-bottom, and a trip-lever connected with the drop-bottom, of a scale-beam adapted for engagement with the trip-lever and provided with a platform beneath the supply-hopper, a slide carrying a scale, a portion of which is visible from the outside of the box-body, a weight held to slide upon the scale-beam, and a connection between the scale-carrying slide and the scale-beam weight, as and for the purpose set forth.

5. In a device of the character described, the combination, with a scale-beam and a device for supplying material to a vessel supported by the scale-beam, of a dial having movement past a sight-opening, a weight held to slide upon the scale-beam, and a connection between the dial and the beam, whereby when the dial is moved the weight will also be moved, as and for the purpose set forth.

6. A machine of the character described, comprising a box having an inlet-opening at its top and two doors on one side, a scale-beam in the box, provided with a receptacle-platform adjacent to one door and below the said inlet-opening, a sliding weight on the beam, a dial having a movement past an opening in the box and connected with the weight, a handle on the dial, projecting adjacent to one of said door-openings, a ticket-delivering mechanism connected with the scale-beam and operated thereby, a passage leading downward to said mechanism from the other of said two doors, and a locking mechanism to simultaneously lock both of the said doors after the operator has placed a receptacle on the platform, dropped a ticket in the passage, and adjusted the dial by means of said handle, substantially as set forth.

SILAS J. MORGAN.

Witnesses:
JOHN BLASER,
D. L. WOOD.